United States Patent
Bugajski

(10) Patent No.: US 6,548,435 B1
(45) Date of Patent: Apr. 15, 2003

(54) BASIC FREE-FLOWING CASTING MATERIAL AND PREFORMS PRODUCED THEREFORM

(76) Inventor: Jerzy Bugajski, Magnesitstrasse 6/19, A-8700 Leoben (AT)

(*) Notice: Subject to any disclaimer, the term of this patent is extended or adjusted under 35 U.S.C. 154(b) by 0 days.

(21) Appl. No.: 09/623,263
(22) PCT Filed: Mar. 1, 1999
(86) PCT No.: PCT/AT99/00051
§ 371 (c)(1), (2), (4) Date: Aug. 30, 2000
(87) PCT Pub. No.: WO99/44964
PCT Pub. Date: Sep. 10, 1999

(30) Foreign Application Priority Data

Mar. 3, 1998 (EP) ............................................. 98890057

(51) Int. Cl.⁷ ..................... C04B 35/047; C04B 35/105; C04B 35/12
(52) U.S. Cl. ....................... 501/109; 501/110; 501/117; 501/119; 501/120; 501/121; 501/122; 501/132
(58) Field of Search .................. 501/109, 110, 501/117, 119, 120, 121, 122, 126, 132

(56) References Cited

U.S. PATENT DOCUMENTS

| | | | | |
|---|---|---|---|---|
| 4,126,654 A | * | 11/1978 | Montgomery et al. | 264/332 |
| 4,400,474 A | * | 8/1983 | Copperthwaite et al. | 106/692 |
| 4,435,514 A | * | 3/1984 | Hartline | 501/117 |
| 5,021,375 A | * | 6/1991 | Butkus | 428/202 |
| 5,204,298 A | * | 4/1993 | Yaoi et al. | 501/104 |
| 5,362,692 A | * | 11/1994 | Bugajski et al. | 501/103 |
| 5,650,121 A | * | 7/1997 | Dody et al. | 106/38.22 |

FOREIGN PATENT DOCUMENTS

| | | |
|---|---|---|
| EP | 0448156 | 9/1991 |
| EP | 0525394 | 2/1993 |

* cited by examiner

Primary Examiner—David Sample
(74) Attorney, Agent, or Firm—Ostrolenk, Faber, Gerb & Soffen, LLP

(57) ABSTRACT

The invention relates to free-flowing refractory castable material and castings produced therefrom. Refractory non-basic and basic refractory castable materials have been known for a long time. The traditional refractory castable materials have thixotropic properties and must be lined sing vibration technology. In the past, free-flowing refractory castable materials were solely based on alumina raw materials. Attempts to produce an aqueous, highly concentrated basic suspension which would Coma the basis of free-flowing refractory castable materials failed to meet the requirements in terms of theological properties and a low degree of to hydration of the MgO-based materials. It is the aim of the invention to provide the above-mentioned refractory castable material for the monolithic lining or repair of high-temperature equipment and for the production of refractory castings. This is achieved by providing a fine-grained and a mixed fine and coarse-grained alternative. For the fine-grained alternative a refractory, dilatancy-promoting material on MgO basis with a grain size between 0.1 and 45 µm and at least one dilatancy-promoting dispersing and wetting agent is employed with the addition of predetermined amounts of mixing water. For the minced fine and coarse-grained alternative, again on MgO basis, in addition a refractory material with a grain size of up to 15 mm as well as binding agents are employed. In both alternatives, refractory and other additives improving the quality of the final products can also be employed.

20 Claims, 1 Drawing Sheet

BASIC FREE-FLOWING CASTING MATERIAL AND PREFORMS PRODUCED THEREFORM

The invention concerns a basic dilatant refractory, free-flowing refractory castable material and precast shapes produced therefrom, such as bricks, prefabricated elements, insulating refractory products and/or functional products such as pocket block, porous plugs, and sleeves.

Refractory castable materials are defined as refractory materials introduced or shaped by casting. The appropriate consistency of the castable materials is achieved by mixing dry components with to mixing water or mixing solution.

The refractory castable material can solidify by hydraulic setting of the calcium aluminate cements without heating, by chemical bonding or micropowderbonding without and with heating, and by sinter processes at operating temperatures. Examples for chemical bonding are a phosphate bonding, water glass bonding, microsilica bonding, or bonding arising when metal powders are used. Micropowder bonding is chiefly a result of the operation of London-van der Waals attraction forces. Refractory castable materials exhibiting more than one bonding type at once are advantageous for numerous applications, as they show the desired strength over a wide temperature range.

Refractory castable materials have been known for a long time. Depending on their chemical composition and on the raw materials used, one distinguishes non-basic and basic refractory castable materials. Alumina refractory castable materials and zircon-containing refractory castable materials are among the nonbasic ones. Basic raw materials for basic refractory castable materials are magnesia, magnesiochromite, chromium ore, chromium oxide and spinel, for instance $MgCr_2O_4$. Different metal oxides, metal carbides, metal powders or carbon supports are used as refractory additives.

Traditional refractory castable materials lined with the aid of vibration technology are thixotropic. Thixotropy implies a decrease in apparent viscosity with the time of load at constant shear velocity or increase in apparent viscosity (thixotropic rigidification) with decreasing shear rate. Compaction aids such as pneumatic or electrical vibrators must be used for fluidification and compaction of a thixotropic castable material, since this castable material is half-dry and stiff after mixing with water. An inhomogeneous distribution of coarse and fine grains, or demixing, is obtained when a thixotropic refractory castable material is fluidified by an overdose of mixing water, which may be necessary for a lining of narrow fissures and/or complex shapes. An overdose of water will moreover produce a decrease in physical test parameters, such as open porosity and strength. Such monolithic refractory linings have a lower resistance against infiltration and corrosion when used in metallurgical equipment.

Using mechanical compaction aids such as vibrators and/or bottle vibrators has the following disadvantages:

The compacted refractory castable material does not always possess optimum homogeneity, that is, shrinkage cavities may be present;

Problems when lining narrow fissures and complex shapes, since bottle vibrators have a reduced radius of action;

physical stress for operators.

A thixotropic refractory castable material on the basis of magnesite preferred for the lining of steel foundry ladles is know from EP 0,248,171 B1. The bonding of this castable material consists of boric acid, alkali polyphosphates and calcium hydroxide. Vibrators are used in order to achieve sufficient density during lining.

A water containing, refractory castable material on the basis of MgO and having a carbon content between 3 and 10% by weight, a dispersing agent in an amount between 0.1 and 2.0% by weight, and a reactive silicic acid in an amount between 1 and 10% by weight is described in DE 195,18,468 A1. According to this document (see column 2, lines 4 to 7) the silicic acid is decisive for preventing a hydration of the sintered magnesia. This castable material, too, which is used for a monolithic lining of metallurgical melting vessels, and preferably of the slag region of foundry ladles, is compacted by vibration technology.

The use of an oxide-type micropowder dispersed in a nonaqueous dispersion medium is known from EP 0,573,029 B1. This fine-grained suspension on the basis of MgO, $Al_2O_3$, $Cr_2O_3$ and/or $TiO_2$: can be used to produce refractory ceramic materials and castings of high density and strength. The risk of hydration of MgO is reduced since nonaqueous solvents are used to prepare the suspension. Tests have shown that the castings can be made by dry pressing from a castable material containing 85% by weight of coarse-grained matrix material in the grain fraction between 1.0 $\mu$m and 3 mm as well as 15% by weight of a finely divided, previously dispersed MgO micropowder. The raw density and strength of the green compact and of fired castings is distinctly higher than that known in the art. The use of nonaqueous MgO suspensions for the preparation of refractory castable materials is little appropriate on account of the environmental to impacts and of safety risks during the drying and heating of lined devices.

The use of basic aqueous suspensions having a high concentration of MgO micropowder could be advantageous for the production of castings, for instance by dry pressing or ramming, if it was possible the prepare such suspensions. However, it would be necessary not to have an excessive degree of hydration of the MgO-based materials in the suspension.

A process for the preparation of magnesia of low hydration is further known from the document EP 0,448,156 A1. However, it is not possible to produce a refractory castable material with free-flowing properties by this process, even when hydration is low and a large amount of mixing water is used. In this context the reader is referred to the reference examples cited at the end of the description.

Free-flowing alumina refractory castable materials are a relatively new development. In contrast to the thixotropic refractory castable materials, mechanical compaction aids are not needed in order to achieve an appropriate consistency and physical test parameters comparable with those of the thixotropic castable materials. Free flow is promoted by dilatant properties of the castable material. Dilatancy is defined as a decrease in viscosity occurring with decreasing shear rate, here in the sense of so-called rheological dilatancy.

A non-basic refractory, hydraulically bonded refractory castable material is described in EP 0,525,394 B1. This refractory castable material on the basis of alumina raw materials is composed as follows, and exhibits free flow when 3.5 to 7.0 parts by weight of mixing water are added for each 100 parts by weight of solids:

65 to 87% by weight of a refractory matrix material on the basis of Al2O3, ZrO2 and/or Cr2O3 with a grain size between 0.1 and 10.0 mm;

7.0 to 22.0% by weight of a reactive refractory component on the basis of Al2O3, ZrO2 and/or Cr2O3 with a grain size between 0.1 and 10 $\mu$m:

0.5 to 10.0% by weight of a hydraulic binder with an Al2O3 content above 68% by weight;

0.2 to 6.5% by weight of one or several stabilizing additives and/or additives promoting the water retention of the refractory castable material.

Decisive for the desired flow properties of the free-flowing alumina refractory castable material are the adjustment of the grain size ranges in the refractory matrix material and the reactive refractory component as well as the adjustment of the mixing water with the 5 additives named.

The flowability of a free-flowing refractory castable material is rated according to the flow value. The flow value Fo is determined immediately after mixing with the mixing water with a vibration-free consistency test, and using the formula:

$$Fo=[(dm,mm-100\ mm)/100\ mm]\times 100,\%$$

where dm is the mean diameter of the sample after a certain time of flow, and 100 mm is the lower diameter of the truncated cone.

The consistency test of the free-flowing refractory castable materials is performed at present, most often using a truncated cone of 100×70×50 mm and a flow time of 60 sec in accordance with ASTM C-860. The refractory castable material is considered free-flowing when the flow value Fo is at least 80% when determined with the vibration-free consistency test using above truncated cone. A European standard for the consistency testing procedure and evaluation of the flow value for free-flowing refractory castable materials is still in preparation. It has been proposed that the truncated cone should measure 100×70×80 mm and the flow time should be 120 sec. One must expect that the flow value will be correspondingly larger when using this truncated cone.

A high market acceptability and good practical results are recorded at present with free-flowing, hydraulically bonded refractory castable materials based on the alumina raw materials in several industries. They have found applications, both in all those cases where thixotropic non-basic refractory castable materials had already been used in the past, and in the new applications involving industrial devices which are difficult to open up.

From a knowledge of rheological properties of the Al2O3 suspensions and from experience with free-flowing alumina refractory castable materials, so far it had not been possible to provide free-flowing basic refractory castable materials. Experts evidently have believed up to now that the properties of materials on the basis of magnesia and the rheological requirements constitute essential obstacles for the development of a free-flowing basic refractory castable material. This refers to a relatively high demand of mixing water and the hydrating, tendency of magnesia-based raw materials. Free flow of a basic refractory castable material requires above all an optimum dispersion and distinct dilatancy of the highly concentrated aqueous MgO suspension. The flow behavior of a refractory castable material mainly depends on the rheological properties of the suspension developing from the fine-grained components of the castable material.

The present invention has the aim of providing a dilatant refractory basic free-flowing refractory castable material on the basis of magnesia and/or chromium ore. Both an exclusively fine-grained and a mixed fine and coarse-grained alternative are to be provided.

The present aim of providing a fine-grained alternative is met by the elements of claim 1. The refractory castable material prepared according to the compulsory elements of claim 1 can be used to seal very narrow fissures, for instance <10 mm, or as a highly concentrated aqueous suspension, to produce compact bricks, for instance dry-pressed or rammed. It has further been found to be advantageous when, still according to the elements of claim 1, binders, refractory or other additives are used as an option.

Dilatant properties can only be attained with an excellent dispersion, i.e., comminution of large, hard particle agglomerates in the suspension. This finding is used when an aqueous, highly concentrated suspension prepared according to the elements of claim 1 is used to produce bricks. A very good dispersion of the suspension is needed in this case in order to attain a dense, homogeneous matrix of the bricks.

The aim of providing a mixed fine and coarse-grained alternative is met while using the elements of claim 11. Here again the elements mentioned in connection with claim 1 are needed in order to attain free flow of the basic refractory castable material according to the invention, but now the use of binders is compulsory. The introduction or shaping of the refractory castable material can in this alternative occur by casting or pumping. This alternative is applicable primarily for a monolithic lining or repair of high-temperature equipment and/or the production of prefabricated elements, functional products or insulating refractory products.

The basic refractory castable material according to the elements of claims 1 and 11 has the effect of flowing freely and homogeneously after addition of the mixing water and mixing, but without the vibratory compaction needed for the refractory thixotropic castable materials, i.e., without the input of external energy. The flowability is rated in terms of the consistency test following ASTM C-860 described earlier, where the flow value should be at least 80%.

It is a condition for practical applications of a free-flowing basic refractory castable material that the hydration of the MgO-based materials used to prepare the castable material is markedly retarded. This is achieved with the dispersion agents and binders used, the latter being utilized optionally, i.e., when needed in the case of claim 1, and definitely in the case of claim 11. The degree of hydration of the caustic-calcined MgO after contact with the dispersing solution used here was five times smaller than after contact with water. The test was performed over a period of 30 min at 25° C. followed by rapid drying at 160° C. The degree of hydration was determined gravimetrically, a degree of hydration of 100% corresponding to complete transformation of the MgO to $Mg(OH)_2$. The dried or fired test bodies produced from the free-flowing basic refractory castable material revealed no hydration damage. The use of MgO powders pretreated e.g. with carboxylic acids is a further possibility for reducing the hydration of the free-flowing, basic refractory castable materials.

The document EP 0,525,394 B1 discloses a free-flowing non-basic refractory castable material, while with the process described in the document EP 0,448,156 A1 a refractory castable material having free-flowing properties cannot be achieved, hence even- a pooling of these two documents will not suggest the solution offered in claims 1 and 11.

The advantages of the free-flowing basic refractory castable material according to the invention over the free-flowing alumina refractory castable material can become apparent in numerous applications, such as a better corrosion and erosion resistance toward aggressive slags, molten metals, and furnace atmospheres and/or a favorable price/performance ratio.

The ranges of application of the fine-grained and the mixed fine and coarse-grained refractory castable material will be clarified later by the elements cited in the dependent claims and underpinned by the examples.

The following elements are decisive for the distinct dilatant properties—as shown by the shape of the flow curves in FIG. 1—and for free flow of the basic refractory castable material according to the invention: adjusted grain composition, the chemical and physical properties of the grain fraction <45 μm, the type and amount of dispersing agent. According to a preferred embodiment the mixing solution is added in amounts accurate to 0.2 percent by weight.

Further advantageous embodiments of the invention become apparent from the dependent claims 2 to 10 and 12–20.

Claim 2 expresses that fact that the dispersing agents and binders used will substantially retard the MgO hydration of the refractory castable material according to the invention.

The refractory MgO-based materials used in the grain fraction <45 μm according to the elements of claim 1 are preferably the synthetic magnesia types such as caustic magnesia, sintered magnesia and fused magnesia. The MgO powders obtained by spray-calcining are also designated as caustic-calcined magnesia. Such dilatancy-promoting refractory materials can be used advantageously, both according to claim 1 and according to the elements of claim 11. The refractory material, again MgO-based, in the grain size fraction up to 15 mm consists of sintered magnesia, fused magnesia, magnesiochromite co-clinker, and/or magnesiochromite fused grains, according to further elements of claim 3.

It is one of the advantages of the free-flowing refractory castable material according to the invention that it can be provided with one or several types of binders. According to the elements of claim 4, both different chemical, hydraulic but also temporary binders can be used, and in its hardened state the refractory castable material has physical test parameters comparable to those of a basic thixotropic refractory castable material.

The refractory additives according to claim 5 have a grain fraction between 0.1 μm and 3 mm and can influence both the properties and the applications of the refractory castable material, depending on the type of additive. The refractory additives can substantially raise the thermomechanical resistance, the infiltration resistance and/or the thermal shock resistance of the refractory castable material.

Investigations of surface-chemical and rheological properties of aqueous MgO suspensions <45 μm have substantially contributed to finding a solution to the aims set for the invention. A knowledge of the dispersion mechanism is advantageous when selecting refractory additives and, if necessary, the type and amount of binder. An interaction of these components with the fine-grained fraction of the refractory material on the basis of MgO and/or chromium ore can suppress or reinforce dilatant properties and free flow. In the group of phosphates known as chemical binders, for instance, only few are suitable to prepare free-flowing basic refractory castable material if—as indicated in a modification of the elements of claim 6—a particular type of polyelectrolyte is used as the dispersing agent.

A positive effect on dispersing action and dilatant properties of a free-flowing basic refractory castable material has been attained according to the elements of claim 7 of the invention by using particular amines. This effect can be attributed to the adsorption of amines and change in zeta potential of the MgO particles in suspension.

The additives employed according to the elements of claim 8 have diverse effects. Thus, organic fibers can prevent cracks due to drying during heating. Steel fibers can improve the thermal shock resistance of a free-flowing basic refractory castable material. A lower degree of to infiltration of molten metal and slag by capillary action can be attained when for instance adding, according to the invention, spherical materials having diameters of 5 to 80 μm which will evaporate or burn away.

According to the elements of claim 9, the free-flowing basic refractory castable material according to the invention can be employed on account of its properties in all those applications where up to now the thixotropic basic refractory castable materials are used, i.e., for the refractory monolithic lining or repair of high-temperature equipment, as well as for vibration-free production of refractory castings such as prefabricated elements, functional products, insulating refractory products, and above that for the production of dry-pressed or rammed, compact bricks. High-temperature equipment which according to experience is lined with refractory basic products includes, according to the elements of claim 9, ladles, reactors, vessels for treatments, vessels for transport, storage tanks, tundishes, furnaces, converters, regenerators, and runners in the steel, metal, cement, lime and gypsum, chemical and other industries.

In the following the invention will be explained in the instance of embodiments. Examples 1 to 3 refer to the free-flowing refractory castable materials of different compositions according to the elements of claim 11 of the invention, examples 4 and 5 refer to the dilatant refractory castable materials according to the elements of claim 1.

EXAMPLE 1

A free-flowing dilatant refractory castable material according to the invention on the basis of magnesia with phosphate/microsilica bonding has the following composition:

| | | |
|---|---|---|
| Sintered magnesia 98.5% MgO 0.045 to 5 mm | | 65.0% by weight |
| Fused magnesia 98.3% MgO < 0.045 mm | | 15.0% by weight |
| Caustic-calcined magnesia > 97.0% MgO | <0.045 mm | 15.0% by weight |
| Phosphate binder | | 1.0% by weight |
| Binder based on microsilica | | 2.0% by weight |
| Silicon powder | | 1.0% by weight |
| Dry mass | | 100.0% by weight |
| Polyfunctional polyelectrolyte | | 0.7% by weight |
| Water | | 7.8% by weight |
| Mixing solution, relative to solids fraction of dry mass | | 8.5% by weight |

EXAMPLE 2

A free-flowing dilatant refractory castable material according to the invention on the basis of magnesia hydraulically bonded has the following composition:

| | | |
|---|---|---|
| Sintered magnesia 98.5% MgO 0.045 to 5 mm | | 65.0% by weight |
| Fused magnesia 98.3% MgO < 0.045 mm | | 15.0% by weight |
| Caustic-calcined magnesia > 97.0% MgO | <0.045 mm | 12.0% by weight |
| Calcined alumina | 0.2 to 6.0 μm | 3.0% by weight |
| Alumina cement > 69 wt. % $Al_2O_3$ | | 5.0% by weight |
| Dry mass | | 100.0% by weight |
| Polyfunctional polyelectrolyte | | 0.4% by weight |
| Amine | | 0.2% by weight |

| | |
|---|---|
| Water | 6.9% by weight |
| Mixing solution, relative to solids fraction of dry mass | 7.5% by weight |

EXAMPLE 3

A free-flowing dilatant refractory castable material according to the invention on the basis of magnesia and chromium ore with phosphate/microsilica bonding has the following composition:

| | | |
|---|---|---|
| Sintered magnesia 98.5% MgO | 0.045 to 5 mm | 31.0% by weight |
| Chromium ore Transvaal | 0 to 1.5 mm | 35.0% by weight |
| Fused magnesia 98.3% MgO | <0.045 mm | 15.0% by weight |
| Caustic-calcined magnesia > 97.0% MgO | <0.045 mm | 15.0% by weight |
| Phosphate binder | | 2.0% by weight |
| Binder based on microsilica | | 2.0% by weight |
| Dry mass | | 100.0% by weight |
| Sodium salt of polybasic carboxylic acids | | 0.4% by weight |
| Amine | | 0.3% by weight |
| Water | | 7.8% by weight |
| Mixing solution, relative to solids fraction of dry mass | | 8.5% by weight |

EXAMPLE 4

A fine-grained dilatant refractory castable material according to the invention on the basis of magnesia with microsilica bonding has the following composition:

| | | |
|---|---|---|
| Fused magnesia 98.3% MgO | <0.045 mm | 49.8% by weight |
| Caustic-calcined magnesia > 97.0% MgO | <0.045 mm | 47.0% by weight |
| Natural organic polymer | | 0.2% by weight |
| Binder based on microsilica | | 3.0% by weight |
| Dry mass | | 100.0% by weight |
| Polyfunctional polyelectrolyte | | 1.8% by weight |
| Amine | | 0.3% by weight |
| Water | | 23.4% by weight |
| Mixing solution, relative to solids fraction of dry mass | | 25.5% by weight |

The dry components of the castable material in examples 1 to 4 were mixed in a paddle mixer for 6 to 15 minutes, first dry and then with the amount of mixing solution indicated. The flowability after mixing and the physical test parameters of refractory castable material hardened and dried at 160° C., calcined at 900° C., and calcined at 1500° C. can be seen from Table 1.

TABLE 1

The flow value Fo and the physical test parameters of the free-flowing basic refractory castable material of examples 1 to 4 (RD: raw density; OP: open porosity; CCS: cold crushing strength)

| | Example 1 | Example 2 | Example 3 | Example 4 |
|---|---|---|---|---|
| Mixing water, wt. % | 7.8 | 6.9 | 7.8 | 23.4 |
| Fo. % | 105 | 90 | 120 | 130 |
| After drying at 160° C.: | | | | |
| RD, g/cm$^3$ | 2.71 | 2.78 | 2.84 | 2.17 |
| OP, vol. % | 17.7 | 16.8 | 14.0 | 28.3 |
| CCS, N/mm | 34 | 39 | 44 | 32 |
| After burning at 900° C.: | | | | |
| RD, g/cm$^3$ | 2.68 | 2.75 | 2.78 | 2.06 |
| OP, vol. % | 22.1 17 | 19.5 | 23.1 | 36.8 |
| CCS, N/mm | | 23 | 12 | 8 |
| After burning at 1500° C.: | | | | |
| RD, g/cm$^3$ | 2.82 | 2.92 | 2.94 | 2.23 |
| OP. vol. % | 18.7 | 14.3 | 20.6 | 27.4 |
| CCS, N/mm$^2$ | 45 | 41 | 27 | 28 |

The physical test parameters of the free-flowing dilatant basic refractory castable material of examples 1 to 3 listed in Table 1 show that the level of the values for thixotropic MgO-based refractory castable materials with comparable bonding was attained. A higher strength of the refractory castable material according to the invention can be attained when using larger amounts of binders. However, in some cases this may affect the chemical resistance and refractoriness under load.

For the basic aqueous dilatant refractory castable material in example 4, a basic thixotropic refractory castable material with comparably fine grain composition is not available as a reference from prior art.

The degree of hydration of the refractory castable material of example 4 was determined in a hydration test of 24 h at 60° C. and a relative humidity of 100%, and found to be 21%.

Example 5 and the reference examples to examples 4 and 5 were introduced in order to describe even better the hydration resistance of the MgO materials and the flowability of the refractory castable materials produced or not produced according to the elements of this invention.

Reference Example to Example 4

A fine-grained refractory castable material on magnesia basis with microsilica bonding:

| | | |
|---|---|---|
| Fused magnesia 98.3% MgO | <0.045 mm | 49.8% by weight |
| Caustic-calcined magnesia > 97.0% MgO | <0.045 mm | 47.0% by weight |
| Sodium hexametaphosphate | | 0.2% by weight |
| Binder based on microsilica | | 3.0% by weight |
| Dry mass | | 100.0% by weight |
| Boron oxide | | 0.9% by weight |
| Water | | 34.1% by weight |
| Mixing solution (saturated boric acid solution), relative to solids fraction of dry mass | | 35.0% by weight |
| Flow value Fo = 0, refractory castable material not free-flowing | | 100% by weight |
| Degree of hydration 0.1%, test at 60° C., 24 h, relative humidity | | |

Despite a very low degree of hydration this refractory castable material lacks free-flowing properties.

A refractory castable material according to the invention or a highly concentrated MgO suspension can be formulated in such a way that MgO hydration is particularly effectively retarded by the action of dispersing and bonding agents used according to claim 1 or claim 11. This was shown in the instance of example 5, where a caustic-calcined magnesia that was very fine-grained and hence prone to undergo hydration was employed.

EXAMPLE 5

A dilatant, fine-grained refractory castable material on magnesia basis according to the invention:

| | | |
|---|---|---|
| Caustic-calcined magnesia > 97.0% MgO | <0.045 mm | 94.0% by weight |
| Hydraulic binder | | 6.0% by weight |
| Dry mass | | 100.0% by weight |
| Polyfunctional polyelectrolyte | | 2.0% by weight |
| Dispersing agent | | 1.0% by weight |
| Water | | 35.0% by weight |
| Mixing solution, relative to solids fraction of dry mass | | 38.0% by weight |
| Flow value Fo = 120% | | 100% |
| Degree of hydration 5%, Test at 60° C., 24 h, relative humidity 100% | | |

Reference Example to Example 5

A fine-grained refractory castable material on magnesia basis:

| | | |
|---|---|---|
| Caustic-calcined magnesia > 97.0% MgO | <0.045 mm | 94.0% by weight |
| Hydraulic binder | | 6.0% by weight |
| Dry mass | | 100.0% by weight |
| Sodium hexametaphosphate | | 0.2% by weight |
| Boron oxide | | 1.3% by weight |
| Water | | 50.0% by weight |
| Mixing solution (saturated boric acid solution with sodium hexametaphosphate), relative to solids fraction of dry mass | | 51.5% by weight |
| Flow value Fo = 0, castable material not free-flowing | | 100% |
| Degree of hydration 31%, test at 60° C., 24 h, relative humidity | | |

It can be seen from reference examples 4 and 5 that MgO hydration is reduced when employing known prior-art hydration retardants for MgO, viz., a saturated boric acid solution, as well as sodium hexametaphosphate as a dispersing agent, but free flow of the basic refractory castable material cannot be achieved despite a very large amount of mixing water. In the above reference examples, MgO materials promoting dilatancy and hence free flow were used but a dispersing agent according to the invention was not used.

From the reference example 5 it can be seen that a very fine-grained caustic-calcined magnesia could not be protected from hydration as efficiently as in example 5 with saturated boric acid solution. Moreover, it is known that boric acid, already from a concentration of 0.05%, when used as hydration retardant for magnesia has a negative effect on refractoriness.

For comparison: the degree of hydration of a very fine-grained caustic-calcined magnesia was 85% in water without dispersing and binding agents, when determined at 60° C., 24 h, relative humidity 100%.

Figure 1:
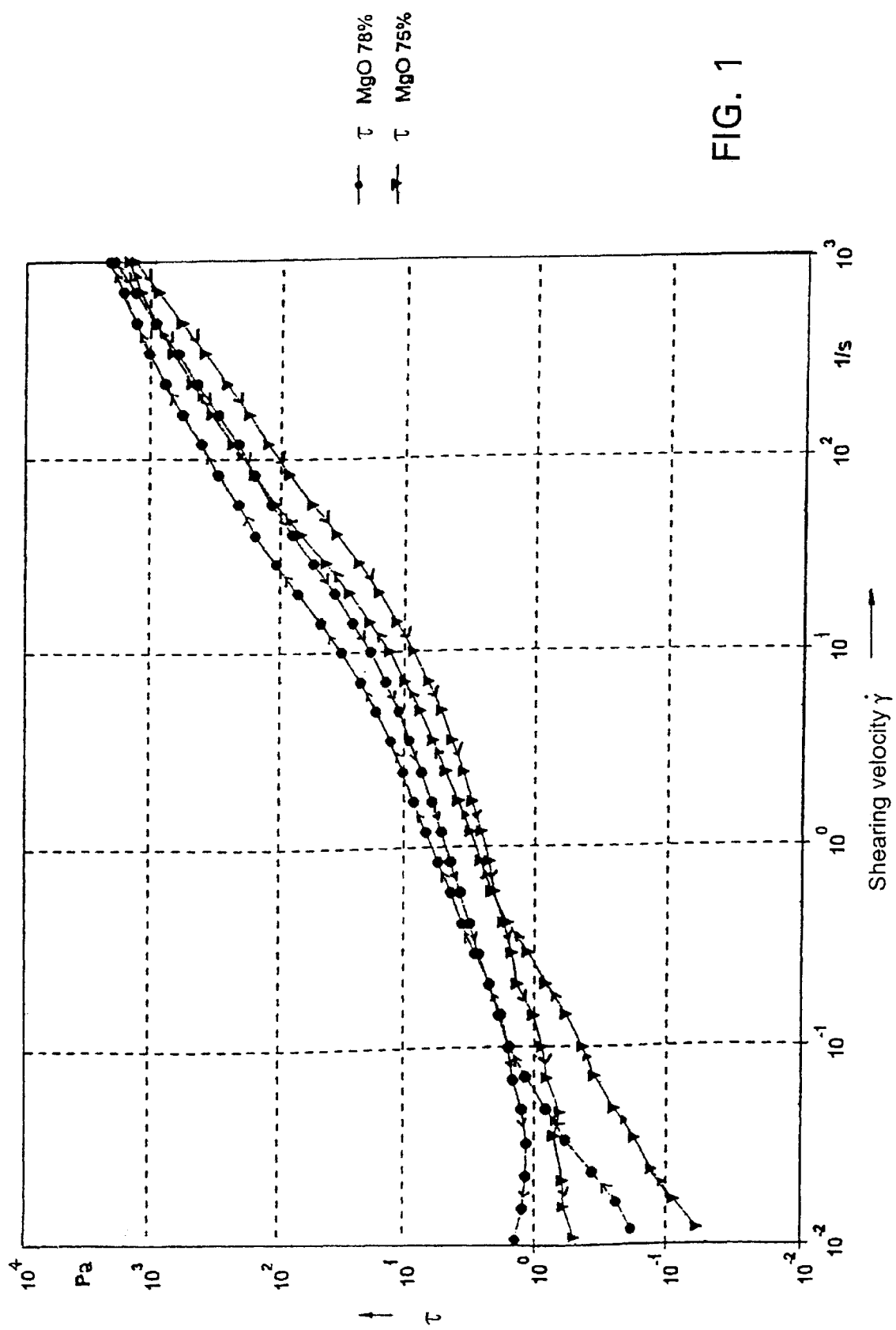
FIG. 1 shows the flow curves (arrows indicate the curves for increasing and decreasing shear rate) of dilatant aqueous suspensions on the basis of MgO <45 μm prepared with two different MgO concentrations (75% and 78%). The composition of the mixing solution corresponds to that of example 4. The flow curves were determined with the cone-plate system.

What is claimed is:

1. Refractory free-flowing basic castable material or highly concentrated aqueous suspension, wherein said material or suspension is characterized by the following composition:
   a) 76.0 to 99.9 wt. % of a refractory dilatancy-promoting material on the basis of MgO and/or chromium ore wherein said material has a grain size between 0.1 and 45.0 μm,
   b) 0.1 to 4.0 wt. % of one or several dilatancy-promoting dispersing and wetting agents, with the addition of mixing water in an amount of 20 to 35 parts by weight of the solids of the castable material or suspension,
   c) optionally 0.1 to 15.0 wt. % of one or several binding agents,
   d) optionally up to 6.5 wt. % of one or several refractory additives selected from the group consisting of $Al_2O_3$, $Cr_2O_3$, $ZrO_2$, $TiO_2$, SiC, metal powder, carbon support, wherein said additives have a grain size below 3 mm,
   e) optionally 0.05 to 2.5 wt. % of one or several additives for preventing cracks arising during drying when heating or for raising the thermal shock resistance and for preventing the infiltration of molten metal and/or slag,
   further characterized in that, after adding the mixing water and mixing, said castable material or suspension has a flow value of at least 80%.

2. Refractory castable material according to claim 1, characterized in that the dispersing and bonding agents employed have MgO hydration retarding properties.

3. Refractory castable material according to claim 1, characterized in that the refractory dilatancy-promoting material with a grain size between 0.1 and 45 μm is selected from the group consisting of sintered magnesia, fused magnesia and caustic magnesia.

4. Refractory castable material according to claim 1, characterized in that the at least one bonding agent is selected from the group consisting of phosphates, sulfates, microsilica, water glasses, alumina cements, clays, boron compounds and temporary bonding agents.

5. Refractory castable material according to claim 1, characterized in that the refractory additive is selected from the group consisting of calcined alumina, fused corundum, MA spinel, chrome oxide green, baddeleyite, titanium oxide, silicon carbide, magnesium powder, silicon powder, aluminum powder, iron powder, ferrochrome powder, carbon black and graphite, wherein said refractory additives have a grain size between 0.1 μm and 3 mm.

6. Casting slip according to claim 1, characterized in that the dispersing and wetting agent is a polyfunctional polyelectrolyte or a salt of polybasic carboxylic acids.

7. Casting slip according to claim 1, characterized in that the dispersing agent is an amine which contains one or several nitrogen substituents: —$C_2H_4OR$, —H, —$CH_3$, —$C_2H_5$, —$C(CH_3)_2CH_2OH$ where R=H or R=$C_2H_4$.

8. Refractory castable material according to claim 1, characterized in that the additives for preventing cracks are selected from the group consisting of organic fibers and/or steel fibers and spherical, evaporating or combusting materials, wherein said spherical materials have a diameter of 5 to 80 μm.

9. Refractory castable material according to claim 1, characterized by its use for the refractory monolithic lining, the production of precast shapes, prefabricated elements, functional products, insulating refractory products and/or dry-pressed or rammed compact bricks, and the repair of devices selected from the group consisting of a ladle, a reactor, a furnace, a vessel for treatment, transport or storage, a tundish, a converter, a regenerator and a runner for use in the steel, metal, cement, lime, gypsum, chemical industry and other industries.

10. Refractory castable material according to claim 1, wherein the composition comprises 80.0 to 98.5 wt. % of the refractory dilatancy-promoting material.

11. Refractory free-flowing basic castable material, wherein said material is characterized by the following composition:
   a) 35.0 to 84.0 wt. % of a refractory material on the basis of MgO and/or chromium ore, wherein said material has a grain size between 0.045 and 15.0 mm,
   b) 15.0 to 50.0 wt. % of a refractory dilatancy-promoting material on the basis of MgO and/or chromium ore, wherein said material has a grain size between 0.1 and 45.0 $\mu$m,
   c) 0.1 to 4.0 wt. % of one or several dilatancy-promoting dispersing and wetting agents, with the addition of mixing water in an amount of 5 to 10 parts by weight of the solids fraction of the castable material,
   d) 0.1 to 15.0 wt. % of one or several bonding agents,
   e) optionally up to 6.5 wt. % of one or several refractory additives selected from the group consisting of $Al_2O_3$, $Cr_2O_3$, $ZrO_2$, $TiO_2$, SiC, metal powder, carbon support, wherein said additives have a grain size below 3 mm,
   f) optionally 0.05 to 2.5 wt. % of one or several additives for preventing cracks arising during drying when heating or for raising the thermal shock resistance and for preventing the infiltration of molten metal and/or slag,
   further characterized in that, after adding the mixing water and mixing, said refractory castable material has a flow value of at least 80%.

12. Refractory castable material according to claim 11, wherein the composition comprises 55 to 75 wt. % of the refractory material with a grain size between 0.045 and 15 mm and 25 to 42 wt. % of the refractory dilatancy-promoting material with a grain size between 0.1 and 45 $\mu$m.

13. Refractory castable material according to claim 11, characterized in that the dispersing and bonding agents employed have MgO hydration retarding properties.

14. Refractory castable material according to claim 11, characterized in that the refractory material with a grain size between 0.045 $\mu$m and 15.0 mm is selected from the group consisting of sintered magnesia, fused magnesia, magnesiochromite coclinker and magnesiochromite fused grain.

15. Refractory castable material according to claim 11, characterized in that the at least one bonding agent is selected from the group consisting of phosphates, sulfates, microsilica, water glasses, alumina cements, clays, boron compounds and temporary bonding agents.

16. Refractory castable material according to claim 11, characterized in that the refractory additive is selected from the group consisting of calcined alumina, fused corundum, MA spinel, chrome oxide green, baddeleyite, titanium oxide, silicon carbide, magnesium powder, silicon powder, aluminum powder, iron powder, ferrochrome powder, carbon black and graphite, wherein said refractory additives have a grain size between 0.1 $\mu$m and 3 mm.

17. Refractory castable material according to claim 11, characterized in that the dispersing and wetting agent is a polyfunctional polyelectrolyte or a salt of polybasic carboxylic acids.

18. Refractory castable material according to claim 11, characterized in that the dispersing agent is an amine which contains one or several nitrogen substituents: —$C_2H_4OR$, —H, —$CH_3$, —$C_2H_5$, —$C(CH_3)_2CH_2OH$ where R=H or R=$C_2H_4$.

19. Refractory castable material according to claim 11, characterized in that the additives for preventing cracks are selected from the group consisting of organic fibers and/or steel fibers and spherical, evaporating or combusting materials, wherein said spherical materials have a diameter of 5 to 80 $\mu$m.

20. Refractory castable material according to claim 11, characterized by its use for the refractory monolithic lining, the production of precast shapes, prefabricated elements, functional products, insulating refractory products and/or dry-pressed or rammed compact bricks, and the repair of devices selected from the group consisting of a ladle, a reactor, a furnace, a vessel for treatment, transport or storage, a tundish, a converter, a regenerator and a runner for use in the steel, metal, cement, lime, gypsum, chemical industry and other industries.

* * * * *